(12) United States Patent
Nakagawa

(10) Patent No.: US 10,503,032 B2
(45) Date of Patent: Dec. 10, 2019

(54) LIQUID CRYSTAL DISPLAY DEVICE

(71) Applicant: Panasonic Liquid Crystal Display Co., Ltd., Himeji-shi, Hyogo (JP)

(72) Inventor: Teruhisa Nakagawa, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 0 days.

(21) Appl. No.: 15/942,053

(22) Filed: Mar. 30, 2018

(65) Prior Publication Data

US 2019/0302546 A1 Oct. 3, 2019

(51) Int. Cl.
*G02F 1/1343* (2006.01)
*G02F 1/1368* (2006.01)
*G02F 1/1362* (2006.01)

(52) U.S. Cl.
CPC ...... *G02F 1/134363* (2013.01); *G02F 1/1368* (2013.01); *G02F 1/13624* (2013.01); *G02F 1/136286* (2013.01); *G02F 2001/134372* (2013.01); *G02F 2201/123* (2013.01)

(58) Field of Classification Search
CPC .......... G02F 1/134363; G02F 1/13624; G02F 1/136286; G02F 1/1368; G02F 2001/134372; G02F 2201/123
See application file for complete search history.

(56) References Cited

U.S. PATENT DOCUMENTS

| | | | |
|---|---|---|---|
| 8,432,522 B2 | 4/2013 | Mori et al. | |
| 8,958,041 B2 | 2/2015 | Park et al. | |
| 9,052,554 B2 | 6/2015 | Ota et al. | |
| 2007/0008242 A1 | 1/2007 | Mori et al. | |
| 2007/0258031 A1* | 11/2007 | Choi | G02F 1/133707 349/129 |
| 2008/0259261 A1* | 10/2008 | Park | G02F 1/134363 349/139 |
| 2010/0128210 A1 | 5/2010 | Mori et al. | |
| 2011/0050551 A1 | 3/2011 | Ota et al. | |
| 2011/0317110 A1 | 12/2011 | Mori et al. | |
| 2013/0265531 A1 | 10/2013 | Mori et al. | |
| 2014/0146263 A1 | 5/2014 | Mori et al. | |
| 2015/0138461 A1 | 5/2015 | Oka et al. | |
| 2017/0293192 A1 | 10/2017 | Mori et al. | |

* cited by examiner

*Primary Examiner* — Jessica M Merlin
(74) *Attorney, Agent, or Firm* — Hamre, Schumann, Mueller & Larson, P.C.

(57) ABSTRACT

A liquid crystal display device of an in-plane switching mode is provided. The liquid crystal display device includes a first gate line and a second gate line. The liquid crystal display device also includes a first data line, a second data line, and a third data line. The liquid crystal display device further includes a first electrode and a second electrode formed in a pixel region surrounded by the first gate line, the second gate line, the first data line, and the second data line. The first electrode includes a first set of slits extending along a first direction in a first section of the pixel region and a second set of slits extending along a second direction in a second section of the pixel region. The third data line overlaps a boundary area between the first section and the second section in the pixel region in plan view.

15 Claims, 15 Drawing Sheets

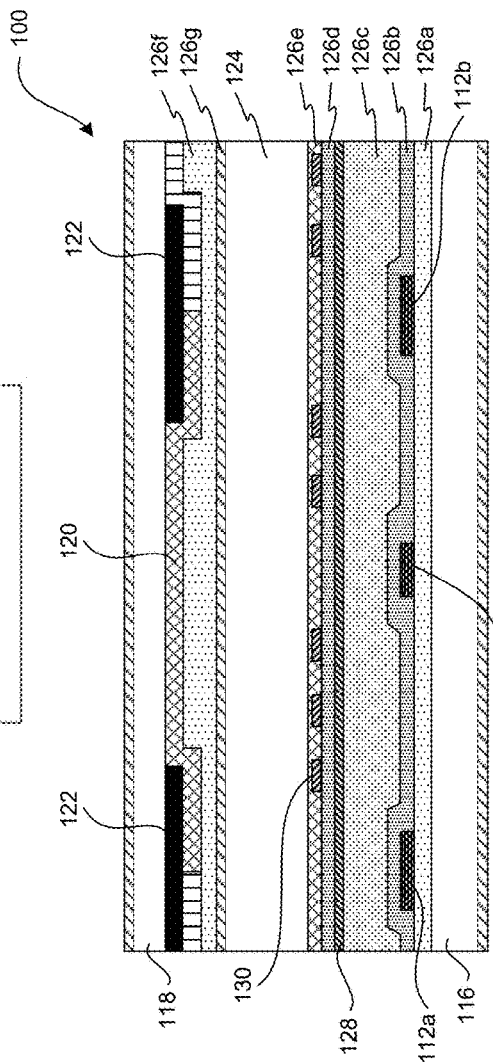
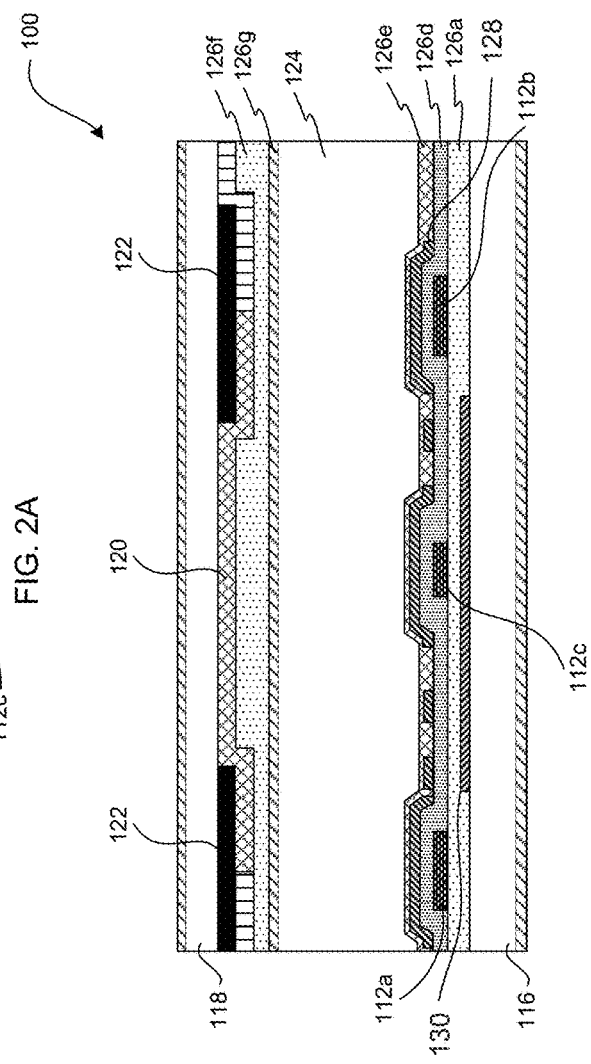
FIG. 2A
FIG. 2B

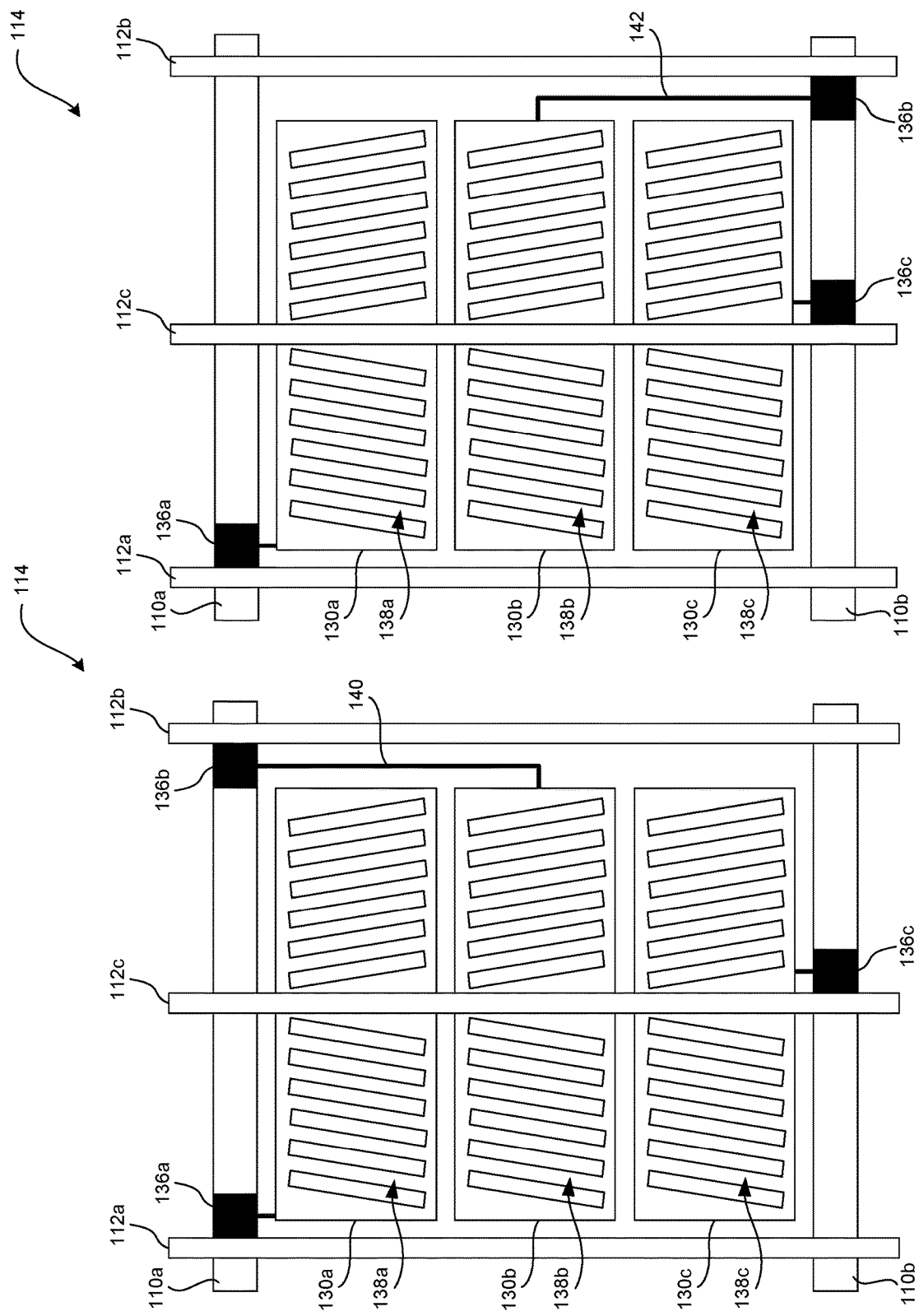

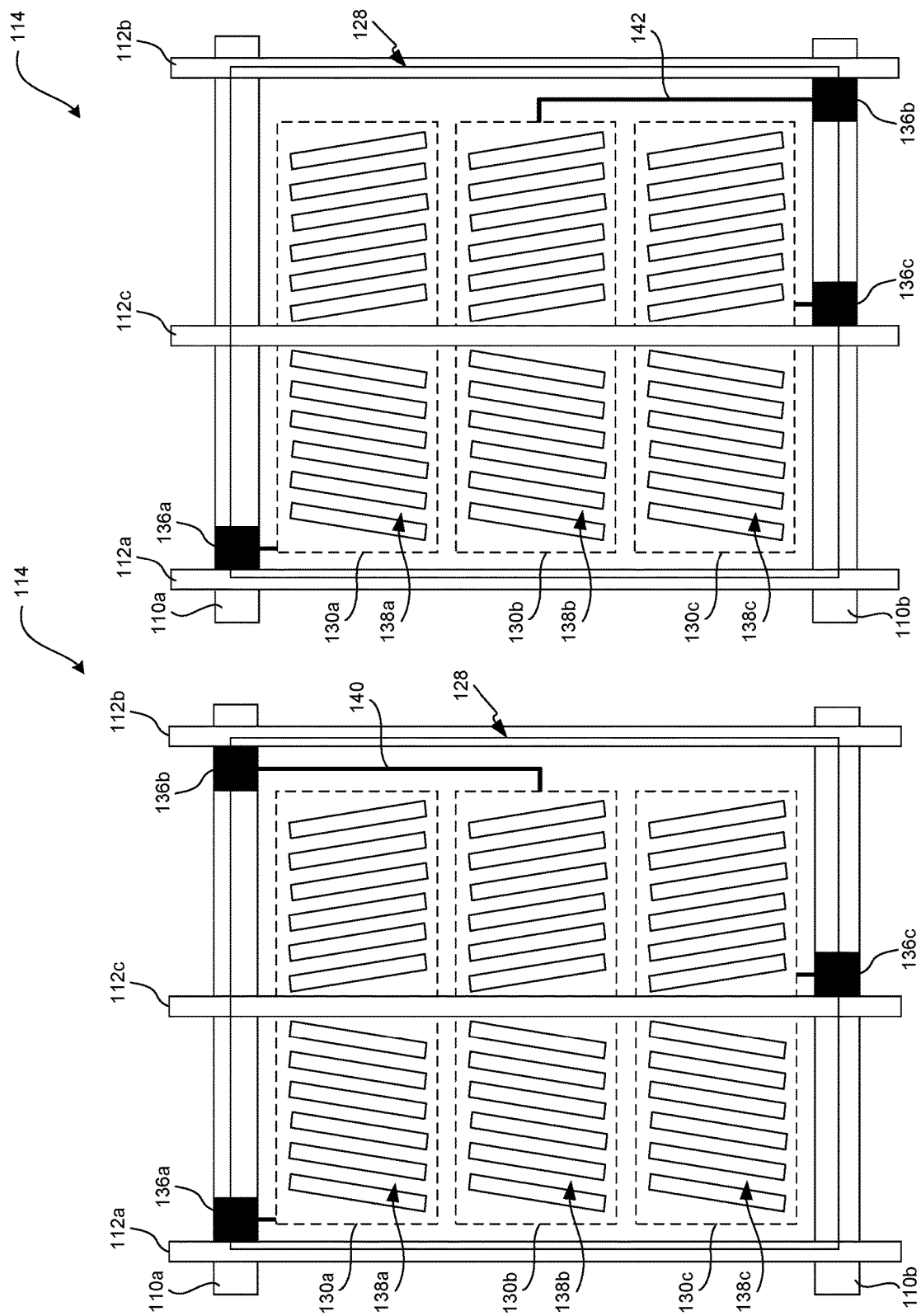

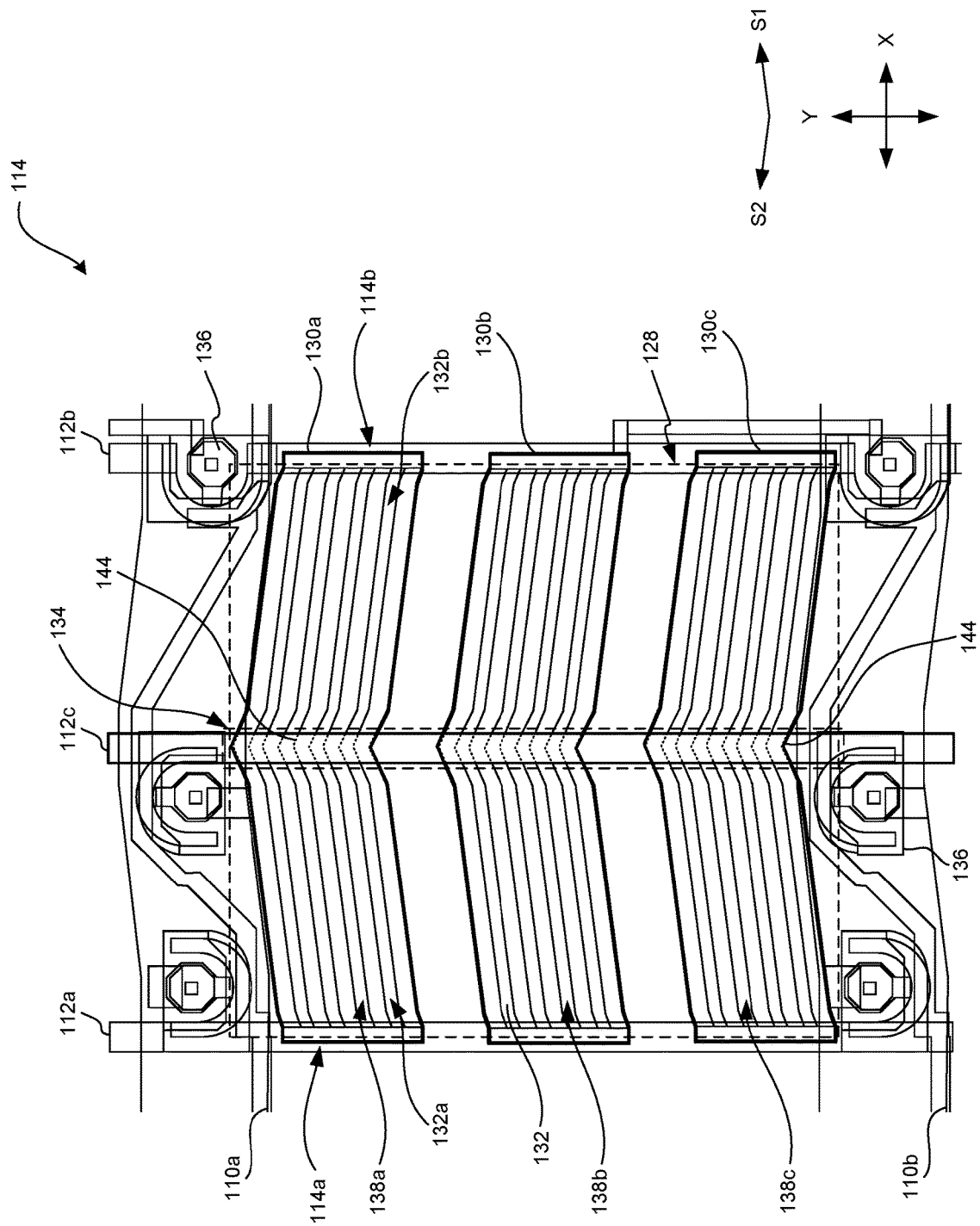

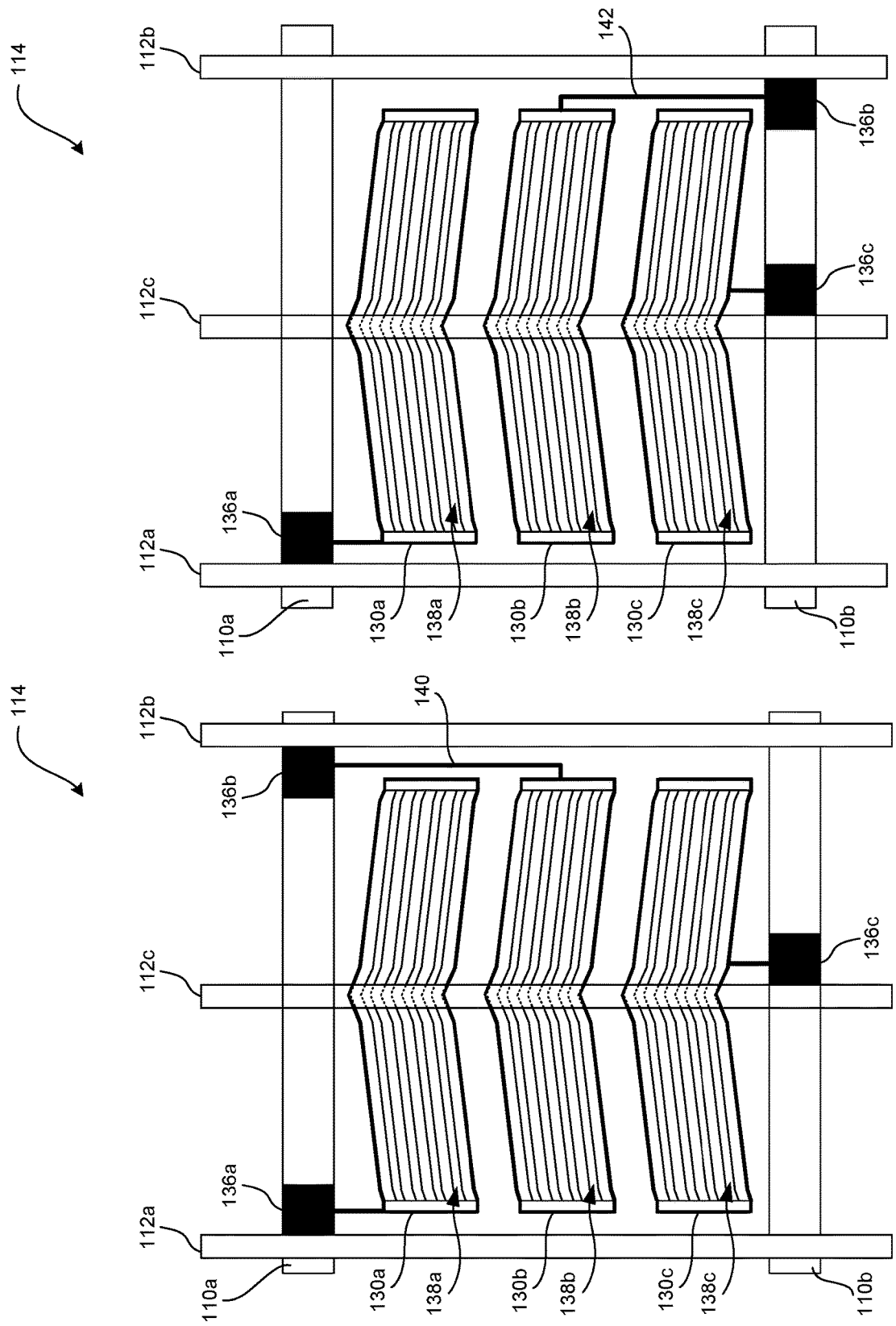

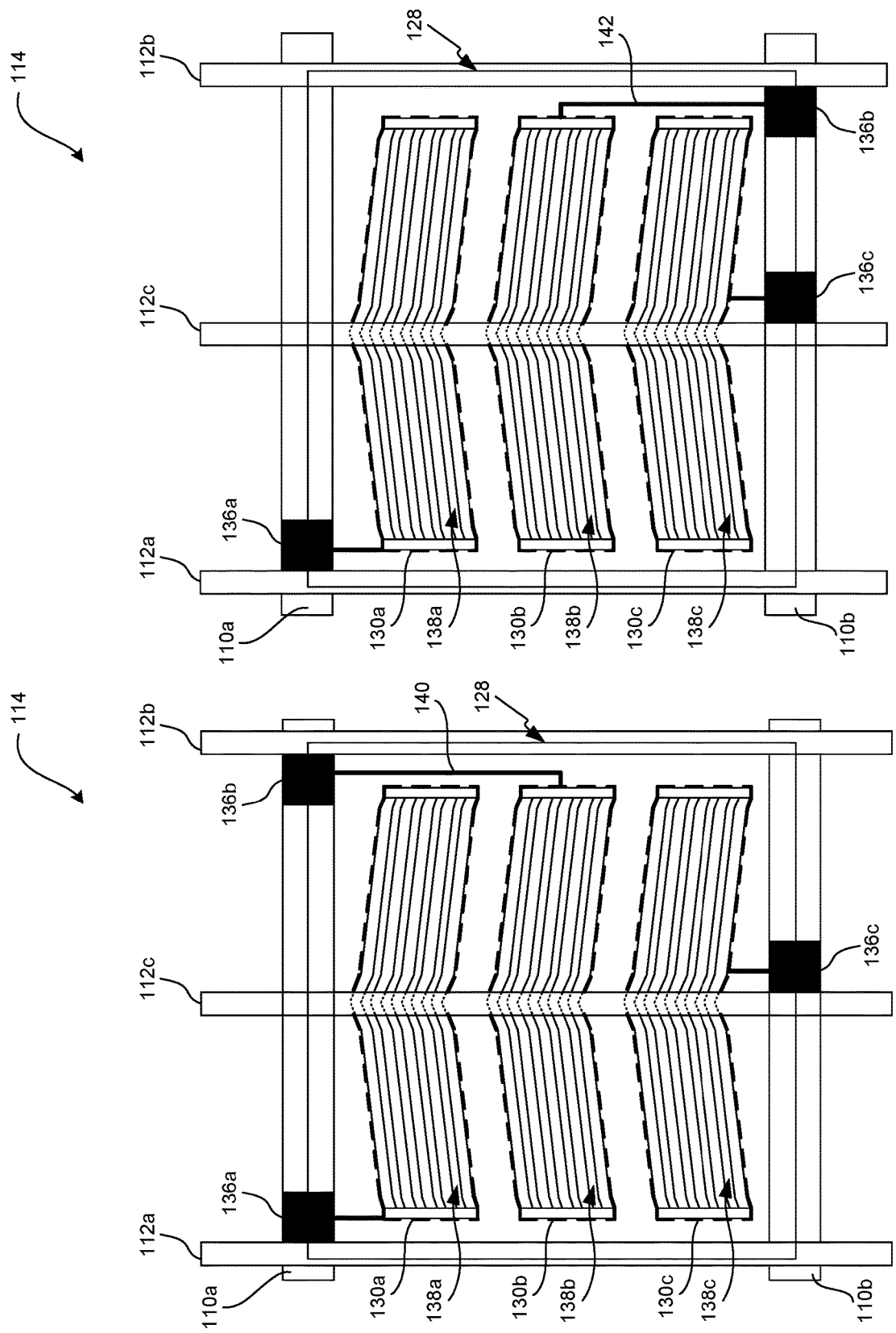

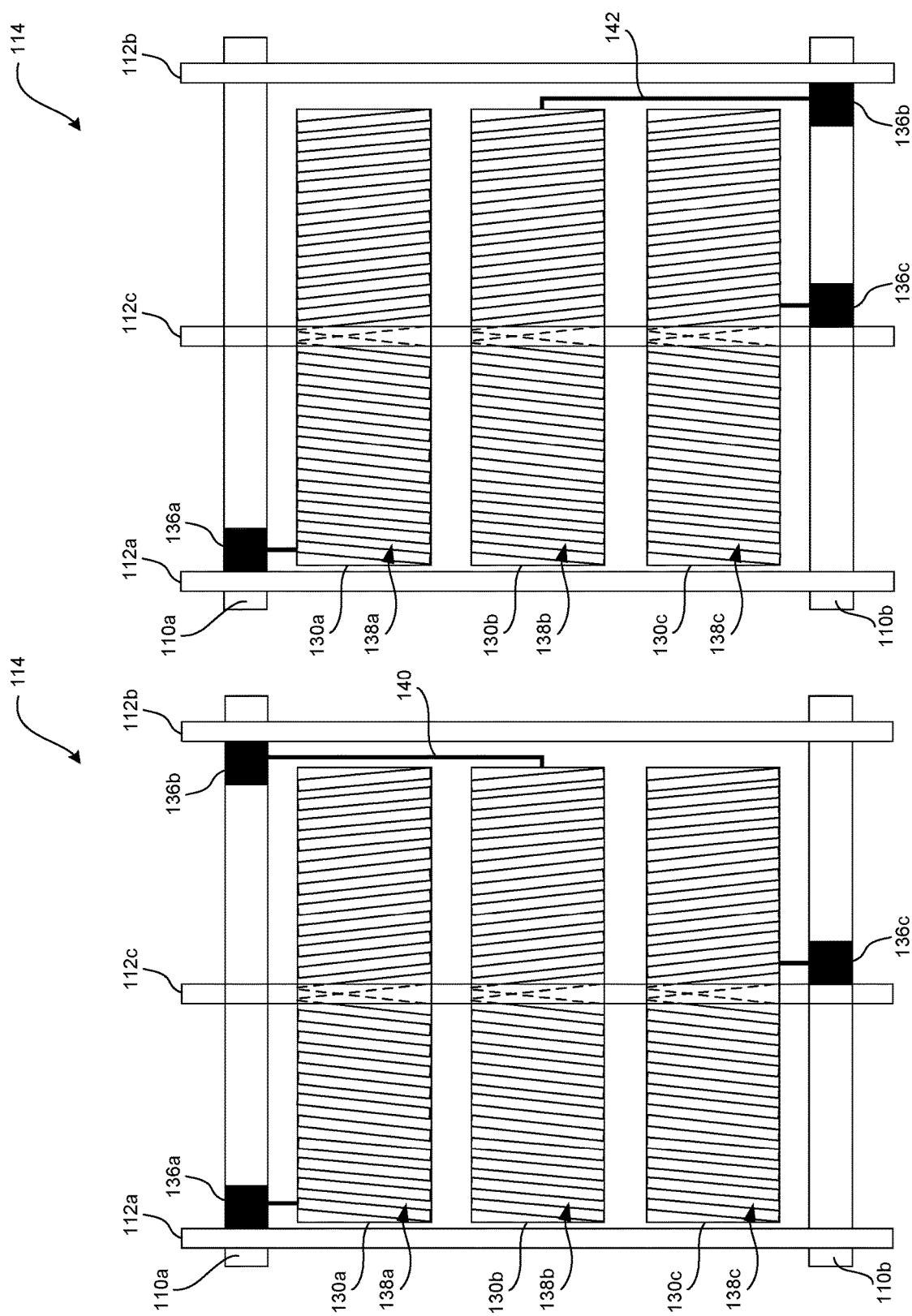

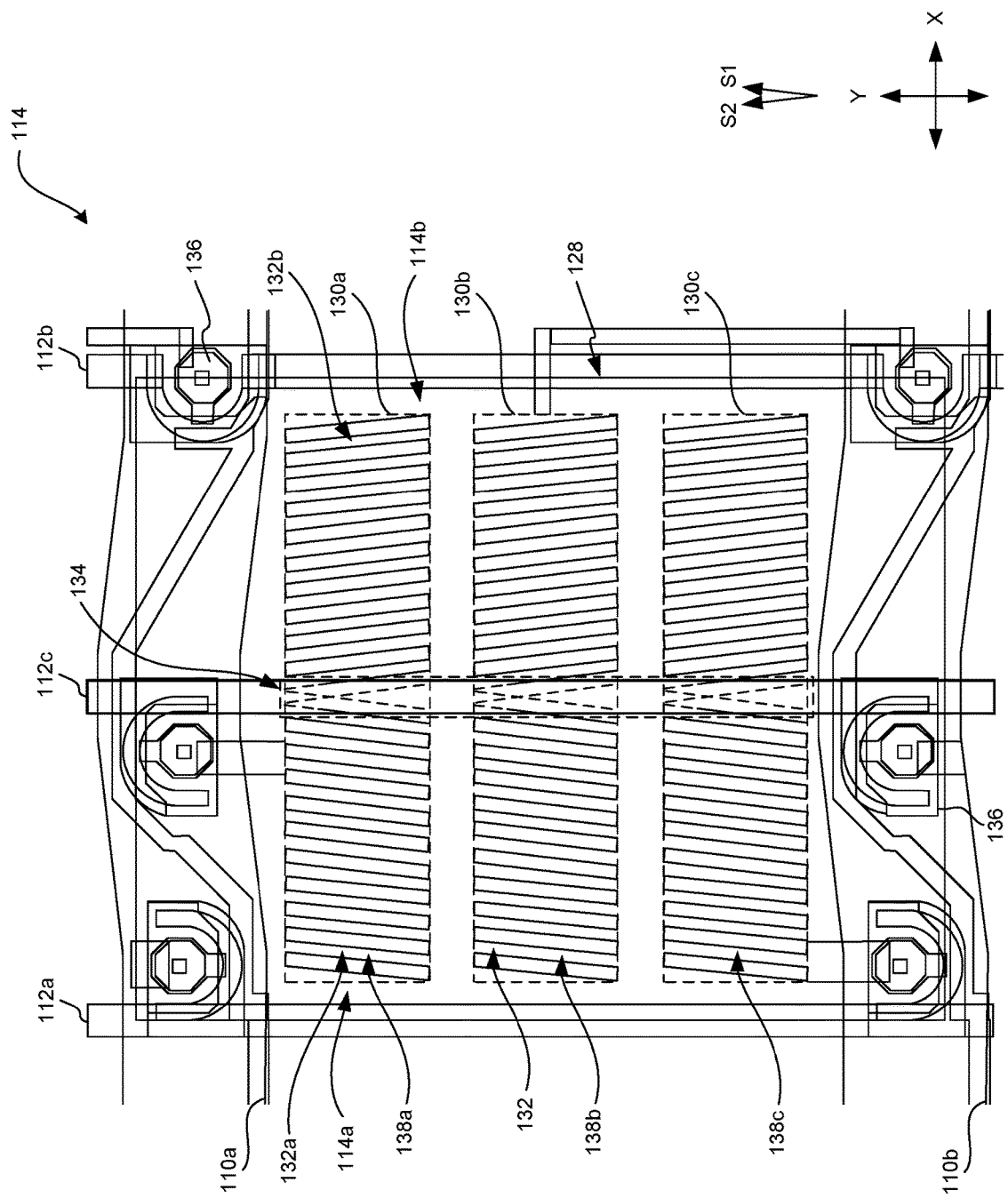

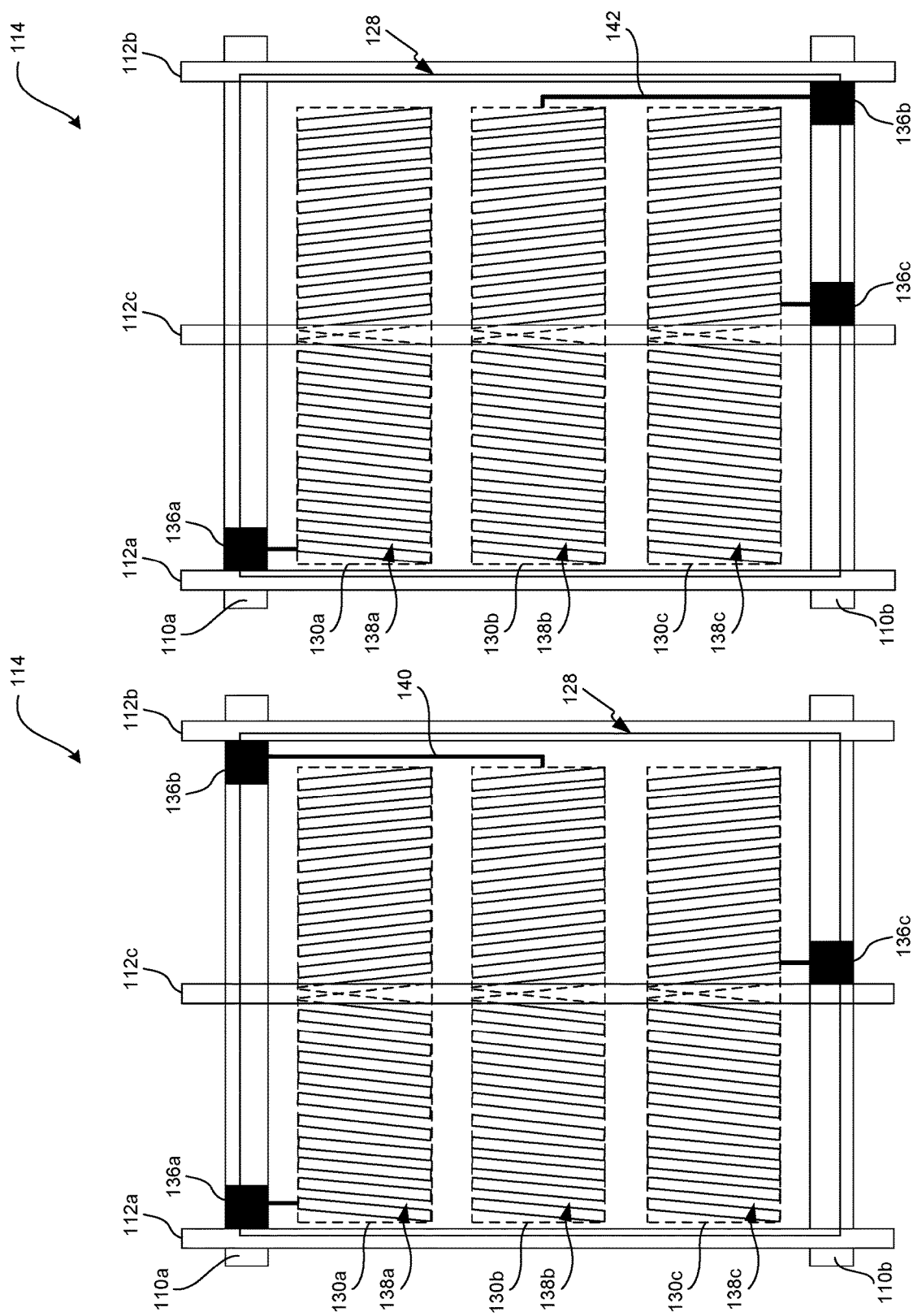

LIQUID CRYSTAL DISPLAY DEVICE

FIELD OF THE PRESENT DISCLOSURE

The present disclosure relates to a liquid crystal display device, and more particularly to a liquid crystal display device of an in-plane switching (IPS) mode.

BACKGROUND

A liquid crystal display device is constituted such that a pair of transparent substrates are arranged to face each other in an opposed manner with a liquid crystal layer being sandwiched therebetween. The liquid crystal display device further includes a plurality of gate lines which extend in a first direction (usually horizontal scanning direction) and are arranged parallel to each other, and a plurality of data lines which extend in a second direction (usually vertical scanning direction) and are arranged parallel to each other, such that the plurality of data lines crosses the plurality of gate lines and define pixel regions therebetween. The liquid crystal display device further includes pixel electrodes and common electrodes which are formed in each pixel region on one of the sides of the liquid crystal layer with respect to the said transparent substrates. In such liquid crystal display device, the pixel electrodes are driven by a large number of switching elements, generally thin film transistors, formed on one of the pair of transparent substrates. The switching elements are disposed in the vicinity of the pixel electrodes at respective crossing portions of the gate lines and the data lines. The pixel electrodes and the common electrodes generate an electric field therebetween. The light passes through the region between the pixel electrode and the common electrode, and the quantity of light is controlled by driving the liquid crystals in the liquid crystal layer based on the applied electric field.

Modern liquid crystal display devices implement IPS (in-plane switching) screen technology using a so-called multi-domain structure which provides regions where the twisting directions of liquid crystal molecules become reverse to each other in each pixel. This helps to offset the difference of coloring which is generated when the display is viewed from the left and the right directions. FIG. 6 illustrates a diagrammatic plan view of a liquid crystal display device of IPS type with said multi-domain structure. As shown, adjacent gate lines GL and adjacent data lines DL intersect with each other, and switching elements TFT are provided at the intersections. In a pixel region PXL, defined by the intersection of the adjacent gate lines GL and the adjacent data lines DL, slits SLT are formed which are extending in Y1-Y2 direction. Here, in each pixel region PXL, the slits SLT have comb-shape or the like, with the slits SLT on the Y1-side and the slits SLT on the Y2-side having different inclined angles with respect to the Y1-Y2 direction. With this structure, as indicated by arrows R1 and R2, it is possible to rotate liquid crystal molecules on the Y1-side of the pixel region PXL and liquid crystal molecules on the Y2-side of the pixel region PXL in different rotational directions. In this manner, it is possible to improve viewing angle characteristics of the liquid crystal display device.

With respect to the liquid crystal display device having the above-mentioned constitution, although the multi-domain structure allows an improvement in viewing angle characteristics of the liquid crystal display device, it is known that disturbance of an electric field occurs at a boundary region BA at which the inclined angle of the slits SLT changes within the same pixel region PXL. Herein, a so-called disclination region is generated at the boundary region BA which defines a non-transmitting portion of the pixel region PXL. Thus, such liquid crystal display devices of IPS mode need improvements from the viewpoint of the display quality. The present invention has been made in view of such considerations, and it is an object of the present invention to improve the display quality of such liquid crystal display device.

SUMMARY

In an aspect, a liquid crystal display device of an in-plane switching mode is disclosed. The liquid crystal display device includes a plurality of gate lines extending along a first axis. The plurality of gate lines includes a first gate line and a second gate line adjacent to each other. The liquid crystal display device also includes a plurality of data lines extending along a second axis different from the first axis. The plurality of data lines includes a first data line, a second data line, and a third data line formed adjacent to both the first data line and the second data line. The liquid crystal display device further includes a first electrode and a second electrode which are counter to each other and are formed in a pixel region. The pixel region is surrounded by the first gate line, the second gate line, the first data line, and the second data line. In the liquid crystal display device, the first electrode includes a first set of slits extending along a first direction in a first section of the pixel region and a second set of slits extending along a second direction in a second section of the pixel region. The third data line at least partially overlaps a boundary area between the first section and the second section in the pixel region in plan view.

In one or more embodiments, the liquid crystal display device further includes a plurality of semiconductor switching elements including a first semiconductor switching element, a second semiconductor switching element, and a third semiconductor switching element. Further, one of the first electrode and the second electrode includes a first pixel electrode, a second pixel electrode, and a third pixel electrode. The first pixel electrode is electrically connected to the first semiconductor switching element, the second pixel electrode is electrically connected to the second semiconductor switching element, and the third pixel electrode is electrically connected to the third semiconductor switching element.

In one or more embodiments, one of the first semiconductor switching element, the second semiconductor switching element, and the third semiconductor switching element is formed on the first gate line, and other two of the first semiconductor switching element, the second semiconductor switching element, and the third semiconductor switching element are formed on the second gate line.

In one or more embodiments, the first data line is electrically connected to the first pixel electrode via the first semiconductor switching element, the second data line is electrically connected to the second pixel electrode via the second semiconductor switching element, and the third data line is electrically connected to the third pixel electrode via the third semiconductor switching element. The third semiconductor switching element is formed closer to the third pixel electrode than the first pixel electrode and the second pixel electrode.

In one or more embodiments, the first semiconductor switching element and the second semiconductor switching element are formed on the first gate line, and the third semiconductor switching element is formed on the second gate line. The liquid crystal display device further includes a connecting line electrically connecting the second pixel electrode and the second semiconductor switching element. The connecting line extends along the second data line.

In one or more embodiments, the first semiconductor switching element is formed on the first gate line, and the second semiconductor switching element and the third semiconductor switching element are formed on the second gate line. The liquid crystal display device further includes a connecting line electrically connecting the second pixel electrode and the second semiconductor switching element. The connecting line extends along the second data line.

In one or more embodiments, a length of each of the first pixel electrode, the second pixel electrode, and the third pixel electrode along the first axis is larger than a width of each of the first pixel electrode, the second pixel electrode, and the third pixel electrode along the second axis, and the boundary area is located at a center of the one or more pixel electrodes along the first axis.

In one or more embodiments, the first pixel electrode, the second pixel electrode, and the third pixel electrode are arranged along the second axis with respect to each other.

In one or more embodiments, the first direction and the second direction are symmetrical about the second axis.

In one or more embodiments, the first set of slits from the first section and the second set of slits from the second section are connected by bent portions at the boundary area, and the third data line at least partially overlaps the bent portions in plan view.

In one or more embodiments, one or more of the plurality of slits from the first section of the pixel region and one or more of the plurality of slits from the second section of the pixel region are intersecting with each other at the boundary area, and the third data line at least partially overlaps an area of intersection of one or more of the plurality of slits from the first section of the pixel region and one or more of the plurality of slits from the second section of the pixel region in plan view.

In one or more embodiments, the liquid crystal display device further includes two substrates and a liquid crystal layer therebetween. The first electrode is formed closer to the liquid crystal layer than the second electrode.

In one or more embodiments, the first electrode is a plurality of pixel electrodes.

In one or more embodiments, the first electrode is a common electrode overlapping the first gate line, the second gate line, the first data line and the second data line in plan view.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

For a more complete understanding of example embodiments of the present disclosure, reference is now made to the following descriptions taken in connection with the accompanying drawings in which:

FIG. 2A is a diagrammatic section view taken along a line A-A' of the liquid crystal display device of FIG. 1, in accordance with one example embodiment of the present disclosure;

FIG. 2B is a diagrammatic section view taken along a line A-A' of the liquid crystal display device of FIG. 1, in accordance with another example embodiment of the present disclosure;

FIG. 3B is a diagrammatic plan view of the pixel region of FIG. 3A, in accordance with one embodiment of the present disclosure;

FIG. 3C is a diagrammatic plan view of the pixel region of FIG. 3A, in accordance with another embodiment of the present disclosure;

FIG. 3E is a diagrammatic plan view of the pixel region of FIG. 3D, in accordance with one embodiment of the present disclosure;

FIG. 3F is a diagrammatic plan view of the pixel region of FIG. 3D, in accordance with another embodiment of the present disclosure;

FIG. 4A is a plan view of a pixel region in the liquid crystal display device of FIG. 1, in accordance with another embodiment of the present disclosure;

FIG. 4B is a diagrammatic plan view of the pixel region of FIG. 4A, in accordance with one embodiment of the present disclosure;

FIG. 4C is a diagrammatic plan view of the pixel region of FIG. 4A, in accordance with another embodiment of the present disclosure;

FIG. 4E is a diagrammatic plan view of the pixel region of FIG. 4D, in accordance with one embodiment of the present disclosure;

FIG. 4F is a diagrammatic plan view of the pixel region of FIG. 4D, in accordance with another embodiment of the present disclosure;

FIG. 5B is a diagrammatic plan view of the pixel region of FIG. 5A, in accordance with one embodiment of the present disclosure;

FIG. 5C is a diagrammatic plan view of the pixel region of FIG. 5A, in accordance with another embodiment of the present disclosure;

FIG. 5D is a plan view of a pixel region in the liquid crystal display device of FIG. 1, in accordance with yet another embodiment of the present disclosure;

FIG. 5E is a diagrammatic plan view of the pixel region of FIG. 5D, in accordance with one embodiment of the present disclosure;

FIG. 5F is a diagrammatic plan view of the pixel region of FIG. 5D, in accordance with another embodiment of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure is not limited to these specific details.

Reference in this specification to "one embodiment" or "an embodiment" means that a particular feature, structure, or characteristic described in connection with the embodiment is included in at least one embodiment of the present disclosure. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced item. Moreover, various features are described which may be exhibited by some embodiments and not by others. Similarly, various requirements are described which may be requirements for some embodiments but not for other embodiments.

Figure 1:
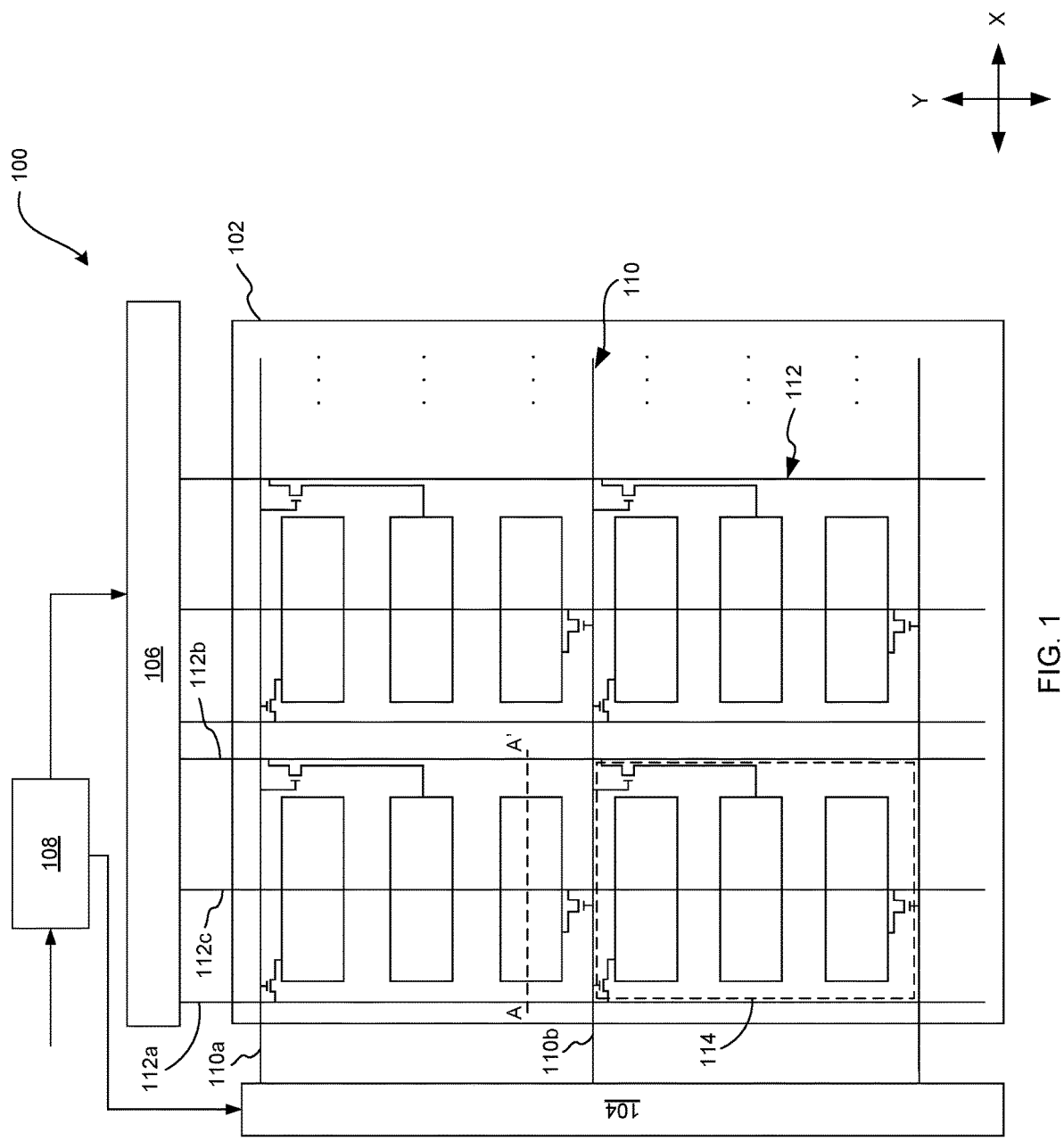
FIG. 1 is a schematic representation of a liquid crystal display device, in accordance with one or more embodiments of the present disclosure.

FIG. 1 illustrates a schematic configuration of a liquid crystal display device (generally referenced by the numeral 100) according to an exemplary embodiment of the present disclosure. The liquid crystal display device 100 includes a display panel 102 that displays an image. The liquid crystal display device 100 also includes a backlight (not illustrated) that irradiates the display panel 102 with light from a rear surface side. The display panel 102 is driven by a gate line driving circuit 104 and a data line driving circuit 106, which may be disposed in or outside of the display panel 102. A timing controller 108 is provided that controls the gate line driving circuit 104 and the data line driving circuit 106.

As illustrated in FIG. 1, the liquid crystal display device 100 includes a plurality of gate lines (generally referenced by the numeral 110) and a plurality of data lines (generally referenced by the numeral 112). As may be contemplated, the plurality of gate lines 110 are connected to the gate line driving circuit 104 and the plurality of data lines 112 are connected to the data line driving circuit 106, respectively. The plurality of gate lines 110 and the plurality of data lines 112 may be formed of Aluminum (Al) or Copper (Cu); however, it may be contemplated that other metals with high melting point, such as Chromium (Cr), Molybdenum (Mo), Tungsten (W), Titanium (Ti), Tantalum (Ta) or an alloy of two or more kinds of these metals, or a lamination film of two or more kinds of these metals or alloys, may be used without any limitations. As shown, the plurality of gate lines 110 are extending along the direction of a first axis (shown as 'X' axis) and the plurality of data lines 112 are extending along the direction of a second axis (shown as 'Y' axis). Further, as shown, the plurality of gate lines 110 are disposed parallel to each other in the direction of the second axis 'Y' and the plurality of data lines 112 are disposed parallel to each other in the direction of the first axis 'X'. As may be seen, the first axis 'X' is extending along a direction which is different from the direction of the second axis 'Y'. In one example, the first axis 'X' and the second axis 'Y' are orthogonal to each other, with the first axis 'X' generally extending along horizontal scanning direction and the second axis 'Y' generally extending along vertical scanning direction.

For reference purposes, the plurality of gate lines 110 has been shown to include a first gate line 110a and a second gate line 110b which are disposed adjacent to each other. Further, the plurality of data lines 112 has been shown to include a first data line 112a, a second data line 112b, and a third data line 112c which is formed adjacent to both the first data line 112a and the second data line 112b. As illustrated in FIG. 1, the third data line 112c may be disposed between the first data line 112a and the second data line 112b. In the liquid crystal display device 100, a pixel region 114 is defined surrounded by the first gate line 110a, the second gate line 110b, the first data line 112a, and the second data line 112b. It may be understood that the liquid crystal display device 100 may include multiple pixel regions, similar to the pixel region 114, as defined between any of the two adjacent gate lines 110, and any two of either the even-numbered or odd-numbered data lines 112 therein.

FIGS. 2A-2B illustrate simplified cross-sectional views of the liquid crystal display device 100 taken along a line A-A' of FIG. 1, according to two different embodiments of the present disclosure. As illustrated in FIGS. 2A-2B, the liquid crystal display device 100 includes two substrates, a first substrate 116 and a second substrate 118 disposed opposite to each other. The first substrate 116 and the second substrate 118 are each manufactured with use of a transparent glass substrate. In one or more examples, the first substrate 116 and the second substrate 118 may have a substantially rectangular planar shape. In the present examples, the first substrate 116 is positioned on a back surface side proximal to the light source and the second substrate 118 is positioned on a front surface side away from the light source, of the liquid crystal display device 100; however, in other examples, such arrangement may be reversed without any limitations. In one or more examples, the second substrate 118 may include a color filter 120 and a black matrix layer 122 formed thereon in a laminated manner. The liquid crystal display device 100 also includes a liquid crystal layer 124 sandwiched between the first substrate 116 and the second substrate 118.

Further, as illustrated in FIGS. 2A-2B, the first substrate 116 includes a first electrode and a second electrode which are disposed counter to each other. The first electrode and the second electrode are formed in the pixel region 114 of the liquid crystal display device 100. It may be noted that the first electrode and the second electrode are both located on a same side of the liquid crystal layer 124. In the present embodiments, the first electrode is formed closer to the liquid crystal layer 124 as compared to the second electrode. In other words, the first electrode may generally be located farther from the first substrate 116 as compared to the second electrode, and the second electrode may generally be located proximal to the first substrate 116 as compared to the first electrode. Generally, the first electrode and the second electrode may have the same material, refractive index, thickness, and area; but could have different materials, refractive indices, thicknesses, and areas without any limitations.

Typically, the first electrode and the second electrode are electrically insulated from each other by one or more insulating layers. In particular, as illustrated in FIG. 2A, the liquid crystal display device 100 includes a gate insulating layer 126a formed so as to cover the gate lines 110 (not shown herein). The data lines 112 are formed on the gate insulating layer 126a. Further, an inorganic insulating layer, also known as passivation layer 126b is formed so as to cover the data lines 112. Generally, an organic insulating layer 126c is formed on the inorganic insulating layer 126b. An interlayer insulating layer 126d, which is typically an inorganic insulating layer, is formed on the second electrode and separating the first electrode and the second electrode, in the liquid crystal display device 100. Also, a first alignment layer 126e is formed so as to cover the first electrode and separating it from the liquid crystal layer 124, in the liquid crystal display device 100. Further, an overcoat layer 126f is formed on the black matrix layer 122 (with any color filter thereon), and a second alignment layer 126g is formed on the overcoat layer 126*f* and separating it from the liquid crystal layer 124, in the liquid crystal display device 100. The liquid crystal display device 100 of FIG. 2B also includes one or more similar insulating layers as shown therein, without any limitations. In some examples, one or more insulating layers may be a laminate constituted of multiple insulating films therein.

In the embodiment of FIG. 2A, the first electrode is a plurality of pixel electrodes 130. In other words, the first electrode includes a plurality of pixel electrodes 130 formed therein. Further, in the embodiment of FIG. 2A, the second electrode is a common electrode 128 overlapping the first gate line 110*a*, the second gate line 110*b*, the first data line 112*a*, and the second data line 112*b* in a plan view (as discussed in the subsequent paragraphs). In such example, the common electrode 128 is formed on the whole area of the pixel region 114 except for the periphery thereof. The common electrode 128 may be formed of transparent conductive bodies, such as ITO1 (Indium-Tin-Oxide), for example. In the embodiment of FIG. 2B, the first electrode is a common electrode 128 overlapping the first gate line 110*a*, the second gate line 110*b*, the first data line 112*a*, and the second data line 112*b* in a plan view (as discussed in the subsequent paragraphs). Further, in the embodiment of FIG. 2B, the second electrode includes one or more pixel electrodes 130. In such example, the common electrode 128 is formed on the whole area of the pixel region 114 except for the periphery thereof. It may be understood that an electric field (e.g., lateral electric field) is generated between the first electrode and the second electrode to control rotation of liquid crystal molecules in the liquid crystal layer 124, of the liquid crystal display device 100.

It shall be noted that the liquid crystal display device 100 of the present disclosure is a liquid crystal display device of in-plane switching (IPS) mode with a multi-domain structure of pixels therein. Here, with respect to the multi-domain structure, in an electric field which is generated in the spreading direction of the liquid crystal layer 124, regions which differ in the direction of the lateral electric field are formed in the inside of each pixel region 114 and by making the twisting direction of molecules of the liquid crystal in each region opposite to each other, an advantageous effect is obtained in that the coloring difference which is generated when the display is viewed from the left and the right can be offset.

Figure 3A:
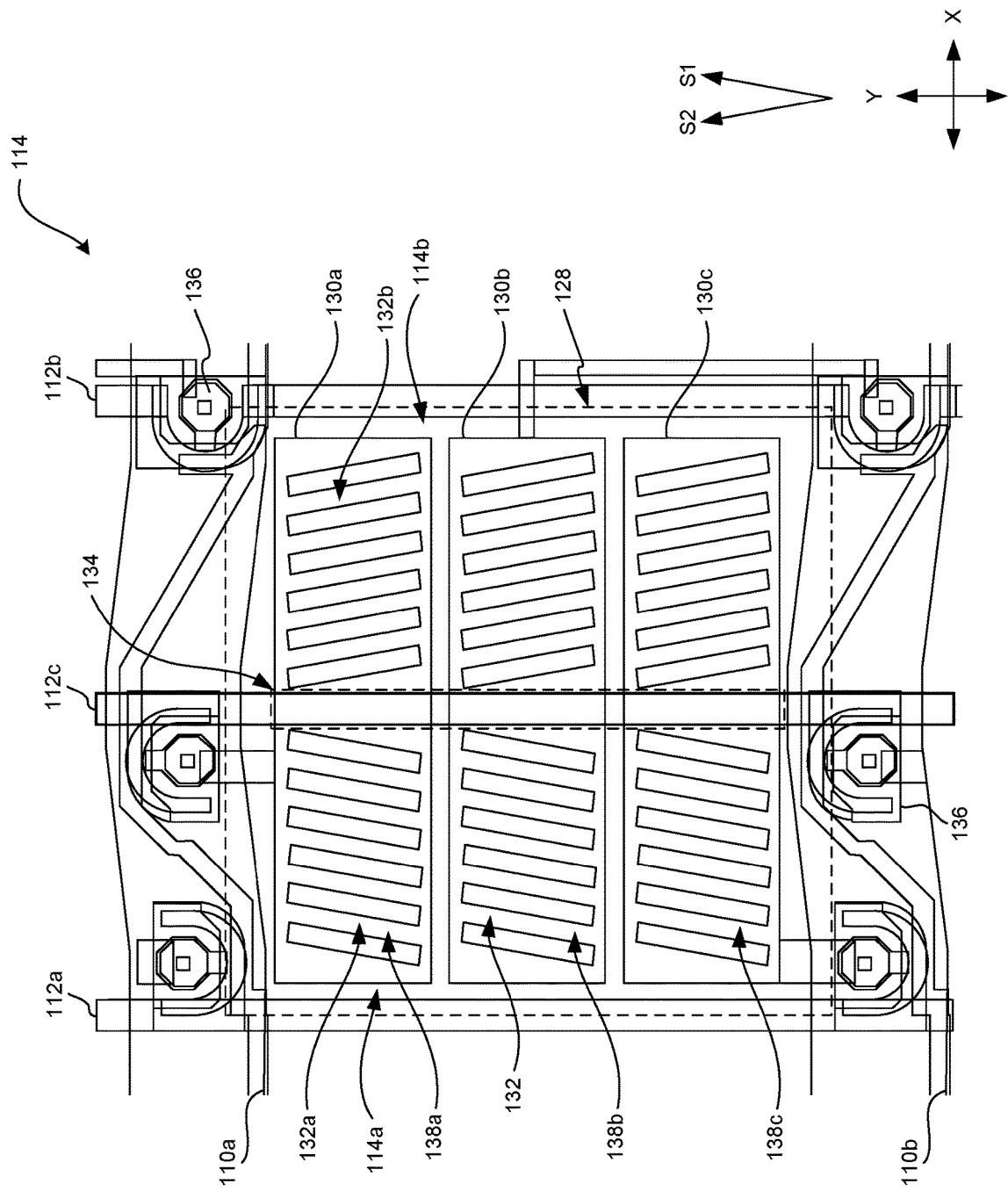
FIG. 3A is a plan view of a pixel region in the liquid crystal display device of FIG. 1, in accordance with one embodiment of the present disclosure.

FIG. 3A is a plan view of the pixel region 114 of the liquid crystal display device 100, according to one embodiment of the present disclosure. FIG. 3A illustrates a so-called S-top configuration with the pixel electrode 130 being on top of the common electrode 128 and the common electrode 128 being shown as a dashed rectangular box for the sake of simplicity. As illustrated in FIG. 3A, the pixel region 114 is generally divided into two sections, a first section 114*a* and a second section 114*b* arranged in the direction of the first axis 'X'. In one or more examples, the first section 114*a* and the second section 114*b* of the pixel region 114 are substantially equal in width along the first axis 'X'. The pixel electrode 130 includes a number of slits (generally referenced by the numeral 132) formed in the pixel region 114. In particular, the pixel electrode 130 includes a first set of slits 132*a* extending along a first direction 'S1' in the first section 114*a* of the pixel region 114 and a second set of slits 132*b* extending along a second direction 'S2' in the second section 114*b* of the pixel region 114. The various slits 132 in the first set of slits 132*a* are generally disposed parallel to each other. Similarly, the various slits 132 in the second set of slits 132*b* are generally disposed parallel to each other. It may be seen that the first direction 'S1' and the second direction 'S2' are at an angle with respect to each other. Thus, it may be contemplated that the first set of slits 132*a* extending along the first direction 'S1' and the second set of slits 132*b* extending along the second direction 'S2' are disposed at an angle with respect to each other.

A boundary area 134 is defined between the first section 114*a* and the second section 114*b*, of the pixel region 114. In one or more examples, the boundary area 134 lies substantially in a middle of the pixel region 114. As may be seen, the boundary area 134 is extending along the second axis 'Y'. In the present examples, the first direction 'S1' and the second direction 'S2' are symmetrical about the second axis 'Y'. A width of the boundary area 134 along the first axis 'X' may vary based generally on a distance between the slit 132 of the first section 114*a* and the slit 132 of the second section 114*b* which are proximal to the boundary area 134. According to an embodiment of the present disclosure, the third data line 112*c* at least partially overlaps the boundary area 134 between the first section 114*a* and the second section 114*b* in the pixel region 114, in the plan view of FIG. 3A. A width of the third data line 112*c* along the first axis 'X' may vary based at least in part on the width of the boundary area 134 corresponding thereto. In one example, the width of the third data line 112*c* may be substantially equal to the width of the boundary area 134 corresponding thereto.

FIGS. 3B-3C illustrate simplified plan views of the pixel region 114 of FIG. 3A showing the pixel electrodes 130 formed therein and omitting some of the other components for the sake of clarity. In one example, the slits 132 in the pixel region 114 may be grouped together to constitute pixels (or sub-pixels) of the liquid crystal display device 100. As illustrated, the slits 132 are grouped together in three groups, namely a first group of slits 138*a*, a second group of slits 138*b*, and a third group of slits 138*c*. Since the slits 132 are formed in the pixel electrode 130, thus the said groups of slits 138*a*, 138*b*, and 138*c* are also located on the pixel electrode 130. In the embodiment of FIG. 2A in which the first electrode is the plurality of pixel electrodes 130, each of the groups of slits 138*a*, 138*b* and 138*c* may correspond to one of the plurality of pixel electrodes 130 in the first electrode. Similarly, in the embodiment of FIG. 2B, in which the second electrode is the plurality of pixel electrodes 130, each of the groups of slits 138*a*, 138*b*, and 138*c* may correspond to one of the plurality of pixel electrodes 130 in the second electrode underneath thereof. In particular, the first group of slits 138*a* may correspond to a first pixel electrode 130*a*, the second group of slits 138*b* may correspond to a second pixel electrode 130*b*, and the third group of slits 138*c* may correspond to a third pixel electrode 130*c*.

It may be contemplated that although three number of pixel electrodes 130 have been shown in the associated drawings, the pixel region 114 may have more or less number of pixel electrodes 130 without affecting the scope of the present disclosure.

In one or more embodiments, a length of each of the first pixel electrode 130*a*, the second pixel electrode 130*b*, and the third pixel electrode 130*c* along the first axis 'X' is relatively larger than a width of each of the first pixel electrode 130*a*, the second pixel electrode 130*b*, and the third pixel electrode 130*c* along the second axis 'Y'. Further, as illustrated, the first pixel electrode 130*a*, the second pixel electrode 130*b*, and the third pixel electrode 130*c* are arranged along the second axis 'Y' with respect to each other. In one example, a distance between the neighboring pixel electrodes 130 is set to a value in a range of 1 to 15 for example, and a width of the pixel electrode 130 is set to a value in a range of 1 to 10 for example.

Further, as illustrated more clearly in FIGS. 3B-3C, the liquid crystal display device 100 further includes a plurality of semiconductor switching elements 136 provided at the intersections of the gate lines 110 and the data lines 112 in the pixel region 114. In one or more examples, the semiconductor switching elements 136 are thin-film transistors. In the liquid crystal display device 100, each of the pixel electrodes 130 are connected to one of the data lines 112 via one of the semiconductor switching elements 136. Therefore, for three number of pixel electrodes 130a, 130b, and 130c, the liquid crystal display device 100 generally includes three number of semiconductor switching elements, namely a first semiconductor switching element 136a, a second semiconductor switching element 136b, and a third semiconductor switching element 136c. The first pixel electrode 130a is electrically connected to the first semiconductor switching element 136a, the second pixel electrode 130b is electrically connected to the second semiconductor switching element 136b, and the third pixel electrode 130c is electrically connected to the third semiconductor switching element 136c.

In preferred embodiments, as illustrated in FIGS. 3B-3C, one of the first semiconductor switching element 136a, the second semiconductor switching element 136b, and the third semiconductor switching element 136c is formed on the first gate line 110a, and other two of the first semiconductor switching element 136a, the second semiconductor switching element 136b, and the third semiconductor switching element 136c are formed on the second gate line 110b. Further, in the preferred embodiment, the third semiconductor switching element 136c is formed closer to the third pixel electrode 130c than the first pixel electrode 130a and the second pixel electrode 130b. Accordingly, the first data line 112a is electrically connected to the first pixel electrode 130a via the first semiconductor switching element 136a, the second data line 112b is electrically connected to the second pixel electrode 130b via the second semiconductor switching element 136b, and the third data line 112c is electrically connected to the third pixel electrode 130c via the third semiconductor switching element 136c. In other alternate examples, the first semiconductor switching element 136a, the second semiconductor switching element 136b, and the third semiconductor switching element 136c may be formed on a same gate line, for example, the first gate line 110a; such that the first semiconductor switching element 136a may be directly connected to the first pixel electrode 130a, and the second semiconductor switching element 136b and the third semiconductor switching element 136c may be connected to the second pixel electrode 130b and the third pixel electrode 130c, respectively, via connecting lines.

As illustrated, in the embodiment of FIG. 3B, the first semiconductor switching element 136a and the second semiconductor switching element 136b are formed on the first gate line 110a, and the third semiconductor switching element 136c is formed on the second gate line 110b. In such embodiment, the first semiconductor switching element 136a is electrically connected to the first pixel electrode 130a and the third semiconductor switching element 136c is electrically connected to the third pixel electrode 130c without the need of any connecting lines (or using very short connecting lines); and a connecting line 140 is electrically connecting the second pixel electrode 130b and the second semiconductor switching element 136b. The connecting line 140 extends along and in proximity to the second data line 112b. Further, as illustrated in the embodiment of FIG. 3C, the first semiconductor switching element 136a is formed on the first gate line 110a, and the second semiconductor switching element 136b and the third semiconductor switching element 136c are formed on the second gate line 110b. Again, in such embodiment, the first semiconductor switching element 136a is electrically connected to the first pixel electrode 130a and the third semiconductor switching element 136c is electrically connected to the third pixel electrode 130c without the need of any connecting lines (or using very short connecting lines); and a connecting line 142 is electrically connecting the second pixel electrode 130b and the second semiconductor switching element 136b. The connecting line 142 extends along and in proximity to the second data line 112b. It may be contemplated by a person skilled in the art that in the embodiments of FIGS. 3B-3C, the position of the first gate line 110a and the second gate line 110b may be reversed and yet the arrangement of the semiconductor switching elements 136 as discussed above may remain valid.

Figure 3D:
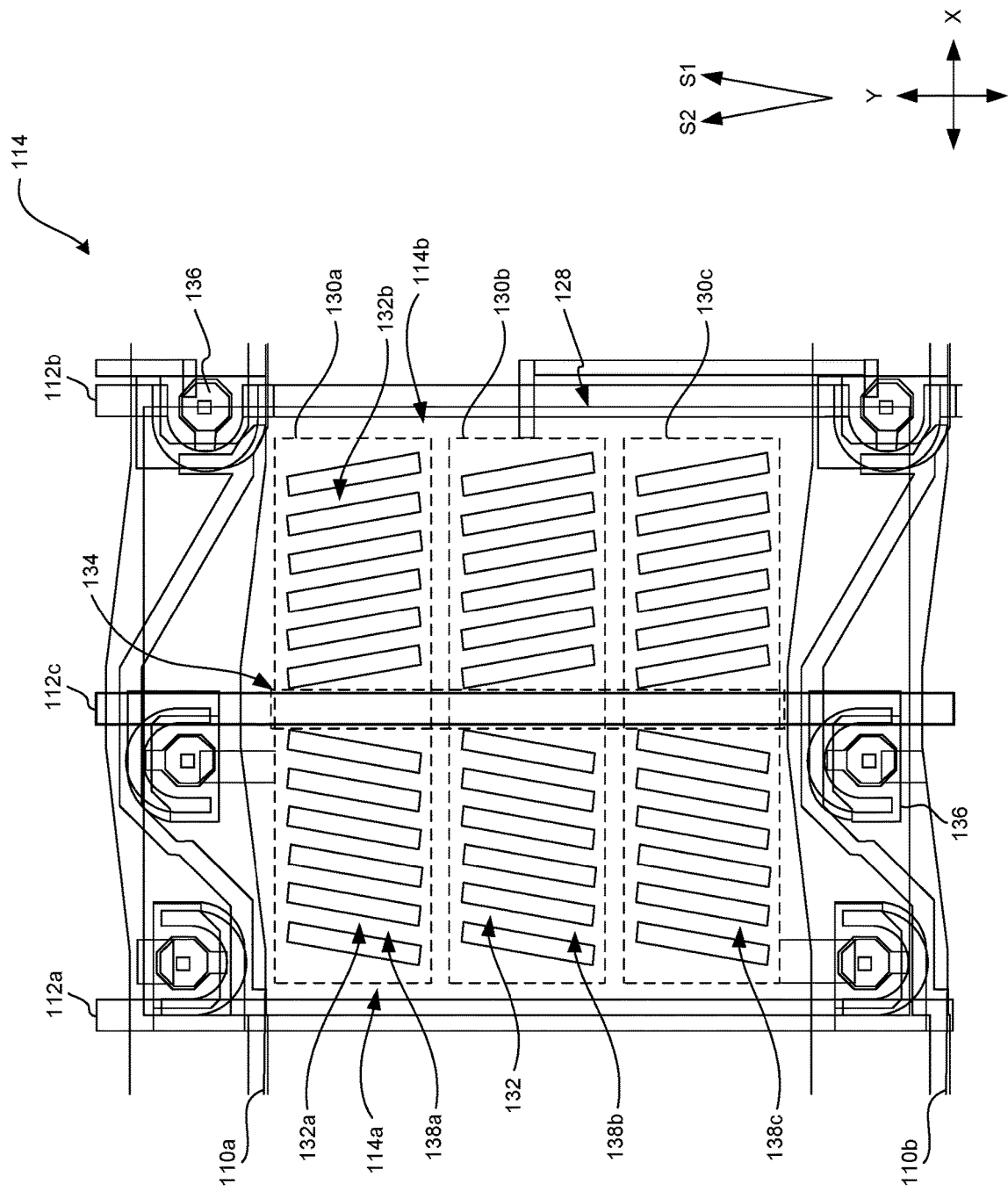
FIG. 3D is a plan view of a pixel region in the liquid crystal display device of FIG. 1, in accordance with one embodiment of the present disclosure.

FIG. 3D is a plan view of the pixel region 114 of the liquid crystal display device 100, according to another embodiment of the present disclosure. FIG. 3D illustrates a so-called C-top configuration with the common electrode 128 being on top of the pixel electrode 130 (corresponding to FIG. 2B). FIGS. 3E-3F illustrate simplified plan views of the pixel region 114 of FIG. 3D. In the embodiments of FIGS. 3D-3F, the slits 132 are formed in the common electrode 128 in a similar manner as that shown in FIG. 3A, and the third data line 112c partially overlaps the boundary area 134 between the two sets of slits 132a and 132b (similar to as described for S-top configuration of FIG. 3A). It may be understood that the slits 132 in the common electrode 128 are formed, generally, in the same position of C-top configuration of FIGS. 3D-3F as that formed in the pixel electrode 130 of S-top configuration of FIGS. 3A-3C. Also, it may be contemplated by a person skilled in the art that although the common electrode 128 is shown limited to the area of the pixel region 114, generally the common electrode 128 may be expanded to overlap the gate lines 110 and the data lines 112, and has openings in areas overlapping with the semiconductor switching elements 136. Other elements, and their positions and connections, may remain the same for C-top configuration of FIGS. 3D-3F as that described above for S-top configuration of FIGS. 3A-3C.

Similar to FIGS. 3A-3C, FIGS. 4A-4C illustrate plan views of the pixel region 114 omitting some of the other components for the sake of clarity. The primary difference between the embodiments of FIGS. 3A-3C and the present embodiments of FIGS. 4A-4C is that the first set of slits 132a from the first section 114a and the second set of slits 132b from the second section 114b are connected by bent portions 144 at the boundary area 134 between the first section 114a and the second section 114b in the pixel region 114. As may be seen the bent portions 144 may be generally arranged in the boundary area 134 along the second axis 'Y'. The bent portions 144 have been shown to have form of inverted 'V' shape; however, it may be contemplated that the bent portions 144 may have any other suitable shape to connect the slits 132 from the first set of slits 132a and the second set of slits 132b, without any limitations. Further, as illustrated, the third data line 112c at least partially overlaps the bent portions 144 in the plan views of FIGS. 4A-4C. In one or more examples, the width of the third data line 112c along the first axis 'X' may vary based at least in part on width of the bent portions 144 along the first axis 'X'. In general, the width of the third data line 112c may be substantially equal to the width of the bent portions 144, along the first axis 'X'.

Figure 4D:
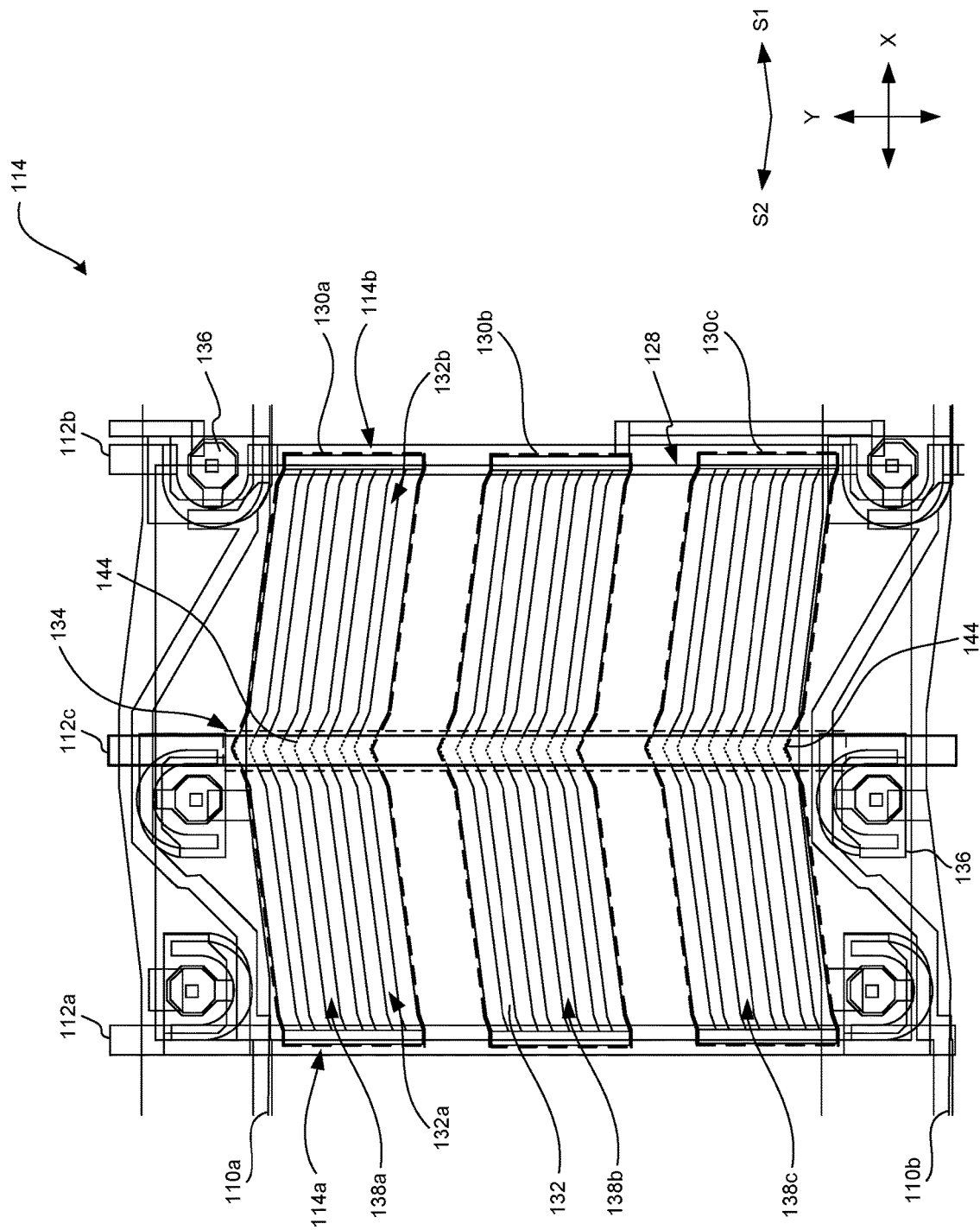
FIG. 4D is a plan view of a pixel region in the liquid crystal display device of FIG. 1, in accordance with another embodiment of the present disclosure.

FIG. 4D is a plan view of the pixel region 114 of the liquid crystal display device 100, according to another embodiment of the present disclosure. FIG. 4D illustrates a C-top configuration with the common electrode 128 being on top of the pixel electrode 130 (corresponding to FIG. 2B). In the embodiments of FIGS. 4D-4F, the slits 132 are formed in the common electrode 128 in a similar manner as that shown in FIG. 4A, and the third data line 112c partially overlaps the boundary area 134 between the two sets of slits 132a and 132b (similar to as described for S-top configuration of FIG. 4A). It may be understood that the slits 132 in the common electrode 128 are formed, generally, in the same position of C-top configuration of FIGS. 4D-4F as that formed in the pixel electrode 130 of S-top configuration of FIGS. 4A-4C. Also, it may be contemplated by a person skilled in the art that although the common electrode 128 is shown limited to the area of the pixel region 114, generally the common electrode 128 may be expanded to overlap the gate lines 110 and the data lines 112, and has openings in areas overlapping with the semiconductor switching elements 136. Other elements, and their positions and connections, may remain the same for C-top configuration of FIGS. 4D-4F as that described above for S-top configuration of FIGS. 4A-4C.

Figure 5A:
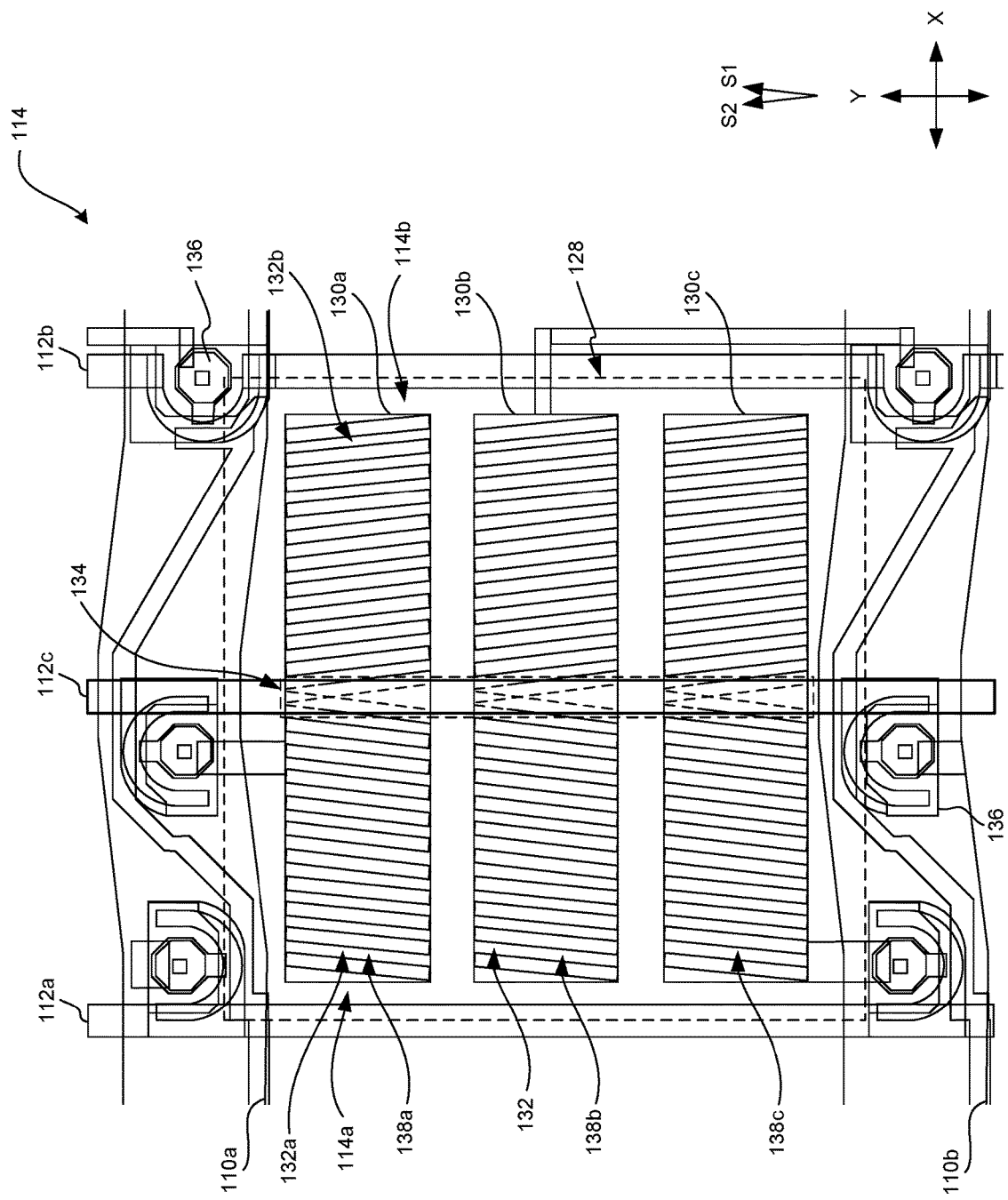
FIG. 5A is a plan view of a pixel region in the liquid crystal display device of FIG. 1, in accordance with yet another embodiment of the present disclosure.

Again, similar to FIGS. 3A-3C, FIGS. 5A-5C illustrate plan views of the pixel region 114 omitting some of the other components for the sake of clarity. The difference between the embodiments of FIGS. 3A-3C and the present embodiments of FIGS. 5A-5C is that one or more of the plurality of slits 132 from the first set of slits 132a in the first section 114a of the pixel region 114 and one or more of the plurality of slits 132 from the second set of slits 132b in the second section 114a of the pixel region 114 are intersecting with each other at the boundary area 134. In the exemplary illustrations of FIGS. 5A-5C, one of the slit 132 of the first section 114a and one of the slit 132 of the second section 114b have been shown to be intersecting with each other at the boundary area 134. Further, as illustrated, the third data line 112c at least partially overlaps an area of intersection between the slits 132 from the first section 114a and the second section 114b, in the pixel region 114. It may be contemplated that the said area of intersection may generally be equivalent to the boundary area 134, as shown in FIGS. 5A-5C. In one or more examples, the width of the third data line 112c along the first axis 'X' may vary based at least in part on a width of the area of intersection along the first axis 'X'. In general, the width of the third data line 112c may be substantially equal to the width of the area of intersection, along the first axis 'X'.

FIG. 5D is a plan view of the pixel region 114 of the liquid crystal display device 100, according to another embodiment of the present disclosure. FIG. 5D illustrates a C-top configuration with the common electrode 128 being on top of the pixel electrode 130 (corresponding to FIG. 2B). FIGS. 5E-5F illustrate simplified plan views of the pixel region 114 of FIG. 5D. In FIGS. 5D-5F, the pixel electrode 130 has been shown as dashed rectangular boxes for the sake of simplicity. In the embodiments of FIGS. 5D-5F, the slits 132 are formed in the common electrode 128 in a similar manner as that shown in FIG. 5A, and the third data line 112c partially overlaps the boundary area 134 between the two sets of slits 132a and 132b (similar to as described for S-top configuration of FIG. 5A). It may be understood that the slits 132 in the common electrode 128 are formed, generally, in the same position of C-top configuration of FIGS. 5D-5F as that formed in the pixel electrode 130 of S-top configuration of FIGS. 5A-5C. Also, it may be contemplated by a person skilled in the art that although the common electrode 128 is shown limited to the area of the pixel region 114, generally the common electrode 128 may be expanded to overlap the gate lines 110 and the data lines 112, and has openings in areas overlapping with the semiconductor switching elements 136. Other elements, and their positions and connections, may remain the same for C-top configuration of FIGS. 5D-5F as that described above for S-top configuration of FIGS. 5A-5C.

As discussed, the liquid crystal display device 100 of the present disclosure adopts the multi-domain structure in which the pixel region 114 has two sets of slits 132 with different inclination with respect to each other so that the twisting directions of the molecules in the liquid crystal layer 124 are opposite to each other. Therefore, in the liquid crystal display device 100, it is possible to obtain an advantageous effect in that the coloring difference which is generated when the display is respectively viewed from the left and right sides can be offset. However, in the boundary area 134 between the first section 114a and the second section 114b, of the pixel region 114, the directions of the electric fields become random so that an opaque region (also referred to as "disclination region") causing "blur" effect may be generated, to which a strict lateral electric field may not be applied. The liquid crystal display device 100 of the present disclosure adopts the constitution which shields the boundary area 134 from light by using the third data line 112c. The arrangement of the third data line 112c over the pixel region 114 allows to substantially minimize, or even mitigate, the "blur" effect created at the boundary area 134 of the pixel region 114 where the twisting directions of molecules of the liquid crystal layer 124 become random. In this manner, it is possible to prevent reduction in image quality which is caused by the disturbance of the electric field at the boundary area 134. In the liquid crystal display device 100, the region in which the third data line 112c is formed (which does not conventionally correspond to a region which transmits backlight) matches the boundary area 134 of the pixel region 114. Therefore, it is possible to improve the aperture ratio (area which can transmit light modulated by the rotation driving of the liquid crystal molecules) of the pixel region 114 without reducing the display quality.

Figure 6:
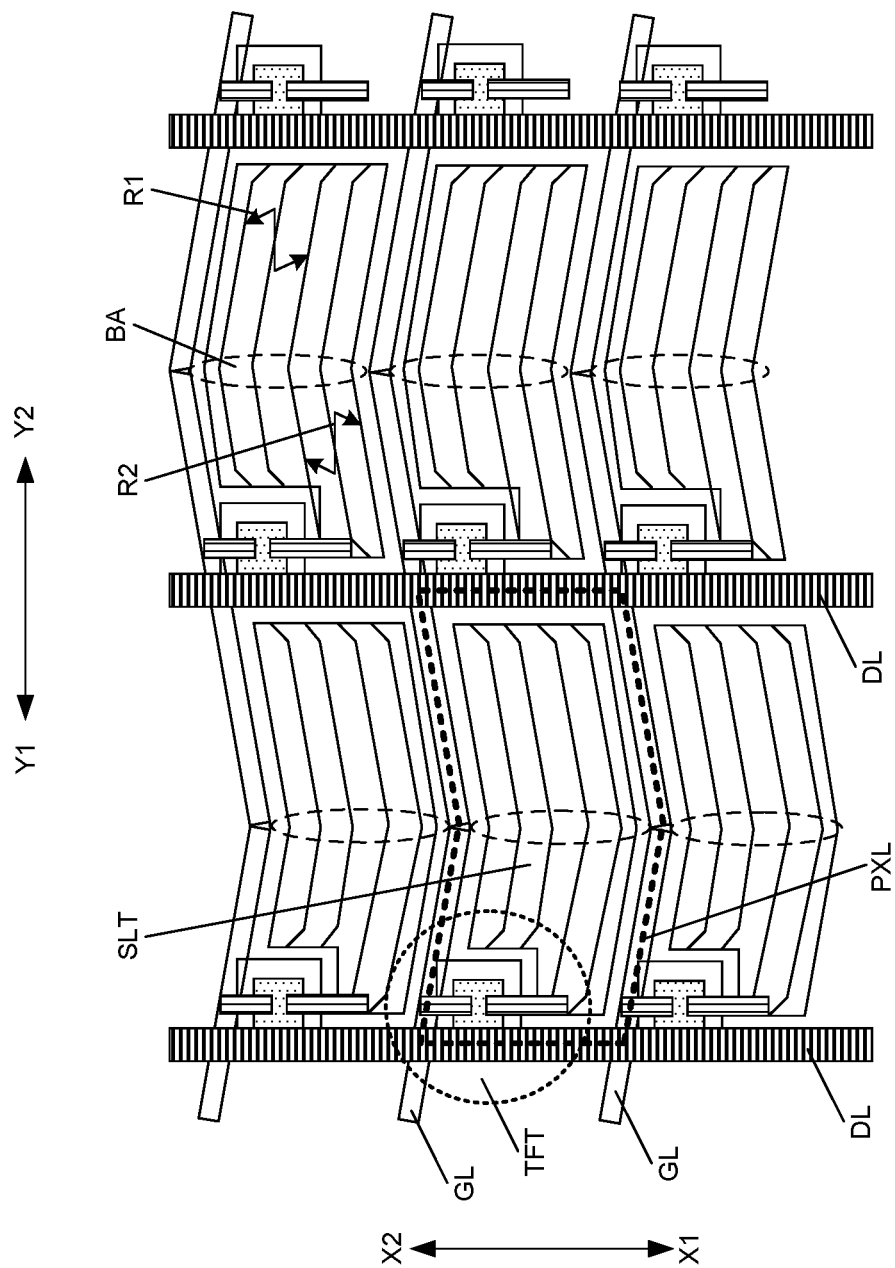
FIG. 6 is a plan view illustrating a pixel structure of a conventional liquid crystal display device.

Although the third data line 112c functions as a light shielding film, the third data line 112c is primarily formed to function as a signal line. In the liquid crystal display device 100, the third data line 112c allows to form a third semiconductor switching element 136c at the intersection thereof with one of the first gate line 110a and the second gate line 110b in the pixel region 114. As may be seen from the conventional liquid crystal display device (as illustrated in FIG. 6), typically additional gate lines are needed to be formed in the pixel region (generally, disposed between the groups of slits) to provide the required number of the TFTs for driving the corresponding number of pixel electrodes. These additional gate lines (which are generally thick) reduce an aperture ratio (area which can transmit light modulated by the rotation driving of the liquid crystal molecules) of the pixel region per se. The implementation of the third data line 112c in the present embodiments eliminate the need of having such additional gate lines, since the required number of semiconductor switching elements 136 may be formed in the pixel region 114 due to additional intersection point(s) available between the gate lines 110 and the third data line 112c. This may further improve the aperture ratio of the pixel region 114, and thereby the entire liquid crystal display device 100 and, in turn, improve the image quality thereof.

Further, as explained in the preferred embodiments of FIGS. 3B, 3C, 4B, 4C, 5B, and 5C, the third semiconductor switching element 136c is formed closer to one of the pixel electrodes 130 in the pixel region 114. This eliminate the need of forming another connecting line for connecting the third semiconductor switching element 136c to the corresponding pixel electrode 130. This may further contribute in improving the aperture ratio of the pixel region 114. This may also eliminate the man-hours needed in terms of labor which would otherwise be needed for forming such extra connecting line, and thereby simplify manufacturing of the liquid crystal display device 100 of the present disclosure, to some extent.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The exemplary embodiment was chosen and described in order to best explain the principles of the present disclosure and its practical application, to thereby enable others skilled in the art to best utilize the present disclosure and various embodiments with various modifications as are suited to the particular use contemplated.

What is claimed is:

1. A liquid crystal display device of an in-plane switching mode, the liquid crystal display device comprising:
   a plurality of gate lines extending along a first axis, the plurality of gate lines including a first gate line and a second gate line adjacent to each other;
   a plurality of data lines extending along a second axis different from the first axis, the plurality of data lines including a first data line, a second data line, and a third data line formed adjacent to both the first data line and the second data line;
   a first electrode and a second electrode counter to each other and are formed in a pixel region, the pixel region being surrounded by the first gate line, the second gate line, the first data line, and the second data line; and
   a plurality of semiconductor switching elements including a first semiconductor switching element, a second semiconductor switching element, and a third semiconductor switching element, wherein
   one of the first electrode and the second electrode includes a first pixel electrode, a second pixel electrode, and a third pixel electrode,
   the first data line is electrically connected to the first pixel electrode via the first semiconductor switching element, the second data line is electrically connected to the second pixel electrode via the second semiconductor switching element, and the third data line is electrically connected to the third pixel electrode via the third semiconductor switching element,
   the first electrode includes a first set of slits extending along a first direction in a first section of the pixel region and a second set of slits extending along a second direction in a second section of the pixel region, and
   the third data line at least partially overlaps a boundary area between the first section and the second section in the pixel region in plan view.

2. The liquid crystal display device according to claim 1, wherein:
   one of the first semiconductor switching element, the second semiconductor switching element, and the third semiconductor switching element is formed on the second gate line, and
   other two of the first semiconductor switching element, the second semiconductor switching element, and the third semiconductor switching element are formed on the first gate line.

3. The liquid crystal display device according to claim 2, wherein the third semiconductor switching element is formed closer to the third pixel electrode than the first pixel electrode and the second pixel electrode.

4. The liquid crystal display device according to claim 2, wherein the first semiconductor switching element and the second semiconductor switching element are formed on the first gate line, and the third semiconductor switching element is formed on the second gate line.

5. The liquid crystal display device according to claim 4, further comprising a connecting line electrically connecting the second pixel electrode and the second semiconductor switching element, wherein the connecting line extends along the second data line.

6. The liquid crystal display device according to claim 2, wherein the first semiconductor switching element is formed on the first gate line, and the second semiconductor switching element and the third semiconductor switching element are formed on the second gate line.

7. The liquid crystal display device according to claim 6, further comprising a connecting line electrically connecting the second pixel electrode and the second semiconductor switching element, wherein the connecting line extends along the second data line.

8. The liquid crystal display device according to claim 1, wherein a length of each of the first pixel electrode, the second pixel electrode, and the third pixel electrode along the first axis is larger than a width of each of the first pixel electrode, the second pixel electrode, and the third pixel electrode along the second axis, and the boundary area is located at a center of the one or more pixel electrodes along the first axis.

9. The liquid crystal display device according to claim 1, wherein the first pixel electrode, the second pixel electrode, and the third pixel electrode are arranged along the second axis with respect to each other.

10. The liquid crystal display device according to claim 1, wherein the first direction and the second direction are symmetrical about the second axis.

11. The liquid crystal display device according to claim 1, wherein the first set of slits from the first section and the second set of slits from the second section are connected by bent portions at the boundary area, and the third data line at least partially overlaps the bent portions in plan view.

12. The liquid crystal display device according to claim 1, wherein one or more of the plurality of slits from the first section of the pixel region and one or more of the plurality of slits from the second section of the pixel region are intersecting with each other at the boundary area, and the third data line at least partially overlaps an area of intersection of one or more of the plurality of slits from the first section of the pixel region and one or more of the plurality of slits from the second section of the pixel region in plan view.

13. The liquid crystal display device according to claim 1, further comprising two substrates, and a liquid crystal layer therebetween, wherein the first electrode is formed closer to the liquid crystal layer than the second electrode.

14. The liquid crystal display device according to claim 13, wherein the first electrode is a plurality of pixel electrodes.

15. The liquid crystal display device according to claim 13, wherein the first electrode is a common electrode overlapping the first gate line, the second gate line, the first data line, and the second data line in plan view.

* * * * *